US010787924B2

(12) United States Patent
Quennehen et al.

(10) Patent No.: US 10,787,924 B2
(45) Date of Patent: Sep. 29, 2020

(54) TURBINE RING ASSEMBLY WITH AXIAL RETENTION

(71) Applicant: SAFRAN AIRCRAFT ENGINES, Paris (FR)

(72) Inventors: Lucien Henri Jacques Quennehen, Moissy-Cramayel (FR); Sebastien Serge Francis Congratel, Moissy-Cramayel (FR); Clement Jean Pierre Duffau, Moissy-Cramayel (FR); Matthieu Simon, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 36 days.

(21) Appl. No.: 15/764,919

(22) PCT Filed: Oct. 4, 2016

(86) PCT No.: PCT/FR2016/052538
§ 371 (c)(1),
(2) Date: Mar. 30, 2018

(87) PCT Pub. No.: WO2017/060604
PCT Pub. Date: Apr. 13, 2017

(65) Prior Publication Data
US 2019/0040758 A1 Feb. 7, 2019

(30) Foreign Application Priority Data

Oct. 5, 2015 (FR) ...................................... 15 59457

(51) Int. Cl.
*F01D 11/00* (2006.01)
*F01D 11/08* (2006.01)
(Continued)

(52) U.S. Cl.
CPC ................ *F01D 11/08* (2013.01); *F01D 9/04* (2013.01); *F01D 11/005* (2013.01);
(Continued)

(58) Field of Classification Search
CPC .......... F16J 15/44; F16J 15/447; F01D 11/08; F01D 11/005; F05D 2240/50
(Continued)

(56) References Cited

U.S. PATENT DOCUMENTS 5,088,888 A * 2/1992 Bobo .................... F01D 11/005
277/644
7,201,559 B2 * 4/2007 Gendraud ............. F01D 11/005
277/641
(Continued)

FOREIGN PATENT DOCUMENTS

| GB | 2481481 A | 12/2011 |
|---|---|---|
| JP | 11-343809 A | 12/1999 |
| JP | 2009-203948 A | 9/2009 |

OTHER PUBLICATIONS

International Search Report dated Jan. 18, 2017, in PCT/FR2016/052538, filed Oct. 4, 2016.

*Primary Examiner* — Justin D Seabe
*Assistant Examiner* — Andrew J Marien
(74) *Attorney, Agent, or Firm* — Oblon, McClelland, Maier & Neustadt, L.L.P.

(57) ABSTRACT

A turbine ring assembly including both a plurality of ring sectors together forming a turbine ring and also a ring support structure including an upstream annular flange and a downstream annular flange, each ring sector having a first horizontal sealing tongue, an upstream vertical sealing tongue, and a first downstream vertical sealing tongue. Each ring sector also includes a second horizontal sealing tongue over the first horizontal sealing tongue in the radial direction of the ring. A first angled sealing element is housed both in
(Continued)

a vertical groove present in the upstream tab and in a second horizontal groove, and a second angled sealing element is received both in a first horizontal groove and in a first vertical groove present in the downstream tab.

8 Claims, 4 Drawing Sheets

(51) Int. Cl.
    *F01D 25/24*     (2006.01)
    *F01D 9/04*     (2006.01)
    *F16J 15/44*     (2006.01)
    *F16J 15/447*     (2006.01)

(52) U.S. Cl.
    CPC ............ *F01D 25/246* (2013.01); *F16J 15/44* (2013.01); *F16J 15/447* (2013.01); *F05D 2220/32* (2013.01); *F05D 2240/50* (2013.01); *F05D 2240/55* (2013.01); *F05D 2300/20* (2013.01)

(58) Field of Classification Search
    USPC .............................. 277/650–654; 415/173.1
    See application file for complete search history.

(56) References Cited

U.S. PATENT DOCUMENTS

| | | | |
|---|---|---|---|
| 9,810,086 B2* | 11/2017 | Correia | F01D 11/005 |
| 9,874,104 B2* | 1/2018 | Shapiro | F01D 25/246 |
| 2004/0062640 A1 | 4/2004 | Darkins, Jr. et al. | |
| 2004/0219011 A1* | 11/2004 | Albers | F01D 11/16 |
| | | | 415/174.2 |
| 2005/0249584 A1* | 11/2005 | Amiot | F01D 9/04 |
| | | | 415/115 |
| 2006/0292001 A1* | 12/2006 | Keller | F01D 11/025 |
| | | | 415/170.1 |
| 2009/0129917 A1* | 5/2009 | Hazevis | F01D 11/005 |
| | | | 415/173.1 |
| 2011/0318171 A1* | 12/2011 | Albers | F01D 11/125 |
| | | | 415/173.1 |
| 2012/0027572 A1* | 2/2012 | Denece | F01D 9/04 |
| | | | 415/127 |
| 2012/0107122 A1* | 5/2012 | Albers | F01D 11/005 |
| | | | 416/179 |
| 2012/0134788 A1* | 5/2012 | Taillant | F01D 9/042 |
| | | | 415/178 |
| 2012/0171027 A1* | 7/2012 | Albers | F01D 11/005 |
| | | | 415/208.1 |
| 2012/0237342 A1* | 9/2012 | Berche | F01D 11/005 |
| | | | 415/174.1 |
| 2015/0118035 A1* | 4/2015 | Gendraud | F01D 9/041 |
| | | | 415/191 |

* cited by examiner

TURBINE RING ASSEMBLY WITH AXIAL RETENTION

BACKGROUND OF THE INVENTION

The invention relates to a turbine ring assembly for a turbine engine, which assembly comprises a plurality of ring sectors each made as a single piece of ceramic matrix composite material or of metal material, together with a ring support structure.

The field of application of the invention is in particular that of gas turbine aeroengines. Nevertheless, the invention is applicable to other turbine engines, e.g. industrial turbines.

Ceramic matrix composite (CMC) materials are known for their good mechanical properties that make them suitable for constituting structural elements, and for their ability to conserve those properties at high temperatures.

In gas turbine aeroengines, improving efficiency and reducing polluting emissions both lead to seeking to operate at ever-higher temperatures. For turbine ring assemblies that are made entirely out of metal, it is necessary to cool all of the elements of the assembly, and in particular the turbine ring, since it is subjected to high temperature streams. Such cooling has a significant impact on the performance of the engine since the cooling stream that is used is itself taken from the main stream through the engine. In addition, using metal for the turbine ring puts a limit on the potential for increasing the temperature in the turbine, even though that would make it possible to improve the performance of aeroengines.

Using CMC for various hot portions of such engines has already been envisaged, particularly since CMCs present density that is less than that of the refractory metals that are conventionally used.

Thus, making turbine ring sectors as a single piece made of CMC is described in particular in Document US 2012/0027572. The ring sectors include an annular base with an inner face that defines the inside face of the turbine ring and an outer face from which there extend two tab-forming portions with ends that are engaged in housings of a metal ring support structure.

The use of CMC ring sectors makes it possible to reduce significantly the amount of ventilation that is needed for cooling the turbine ring. Nevertheless, sealing between the gas flow passage on the inside of the ring sectors and the outside of the ring sectors remains a problem, particularly when the ring sectors present the shape of an upside-down letter Pi (π). Specifically, that type of ring sector does not have a bathtub (or outer seal), which means that it is not possible to install two layers of horizontal sealing level with or above the bearing points between the ring sectors and the support structure for the sectors.

This problem of sealing also arises for metal ring sectors that do not have a bathtub, but that are much easier to fabricate as a result.

OBJECT AND SUMMARY OF THE INVENTION

The invention seeks to avoid such drawbacks, and for this purpose it proposes a turbine ring assembly comprising both a plurality of ring sectors made of ceramic matrix composite material or of metal material together forming a turbine ring and also a ring support structure comprising an upstream annular flange and a downstream annular flange, each ring sector having a first portion forming an annular base with an inner face defining the inside face of the turbine ring and an outer face from which there extend radially an upstream tab and a downstream tab, the upstream and downstream tabs of each ring sector being held between the upstream and downstream annular flanges of the ring support structure, each ring sector having a first horizontal sealing tongue extending along the annular base, the first horizontal sealing tongue being received in a first horizontal groove present in the annular base, an upstream vertical sealing tongue extending along the upstream tab, the upstream vertical sealing tongue being received in a vertical groove present in the upstream tab, and a first downstream vertical sealing tongue extending along the downstream tab, the first downstream vertical sealing tongue being received in a first vertical groove present in the downstream tab, the assembly being characterized in that each ring sector further comprises a second horizontal sealing tongue extending over a portion of the annular base over the first horizontal sealing tongue, the second horizontal sealing tongue being received in a second horizontal groove present in the annular base, and in that a first angled sealing element is received both in the vertical groove present in the upstream tab and in the second horizontal groove, while a second angled sealing element is received both in the first horizontal groove and in the first vertical groove present in the downstream tab, the first vertical groove opening out into the first horizontal groove, or while a second angled sealing element is received both in the second horizontal groove and in the first vertical groove present in the downstream tab, the first vertical groove opening out into the second horizontal groove.

With two horizontal sealing tongues superposed in the radial direction, two levels of sealing are provided at the base of the ring, thereby reinforcing inter-sector sealing in the ring by putting the leakage sections into series in this way, and by doing so while ensuring that the air flowing on the outside of the ring is redirected upstream, i.e. in the rotor disk formed by the rotary blades inside the ring. Furthermore, the use of angled sealing elements makes it possible to plug any leaks that might occur via contacting portions between the sealing tongues, i.e. at orthogonal junctions of the grooves. In the presently-described example, the first angled sealing element prevents leaks via the contacting portions between the first horizontal tongue and the upstream vertical tongue, while the second angled sealing element prevents leaks via the contacting portions between the first or second horizontal tongue and the downstream vertical tongue.

In an embodiment of the gas turbine ring assembly of the invention, each ring sector further comprises a second downstream vertical sealing tongue extending along the downstream tab, the second downstream vertical sealing tongue being received in a second vertical groove present in the downstream tab, the second downstream vertical sealing tongue being in contact at one of its ends with the second horizontal sealing tongue, the second vertical groove present in the downstream tab opening out into the second horizontal groove, the second angled sealing element being received both in the second horizontal groove and in the second vertical groove present in the downstream tab.

By adding a second vertical sealing tongue downstream, the effectiveness of the sealing is further improved, with a first loss of head being caused by one of the two downstream vertical tongues before the other downstream vertical sealing tongue. Reinforcing sealing downstream by using two vertical tongues is advantageous since the pressure difference between the cavity of the ring and the flow passage portion downstream is considerable, thereby increasing the air suction force between these two volumes, and consequently increasing the risk of leaks.

According to a particular characteristic of the turbine ring assembly of the invention, a third angled sealing element is received both in the first horizontal groove and in the first vertical groove present in the downstream tab. This further reduces leaks via contacting portions between the sealing tongues downstream in the ring.

In accordance with another embodiment of the turbine ring assembly of the invention, each ring sector further comprises a second downstream vertical sealing tongue extending along the downstream tab, the second downstream vertical sealing tongue being received in a second vertical groove present in the downstream tab, the second downstream vertical sealing tongue being in contact with the second horizontal sealing tongue, the second vertical groove present in the downstream tab opening out into the first and second horizontal grooves, the second angled sealing element being received both in the first horizontal groove and in the first vertical groove present in the downstream tab.

By adding a second vertical sealing tongue downstream, the effectiveness of the sealing is further improved, a first loss of head being caused by one of the two downstream vertical tongues before the other downstream vertical tongue.

In accordance with another embodiment of the turbine ring assembly of the invention, the upstream annular flange includes a lip in contact with the upstream tab of each ring sector, while the downstream annular flange includes a lip in contact with the downstream tab of each ring sector, the vertical groove present in the upstream tab of each ring sector extending in a direction that is oblique relative to the axis of the upstream tab, said vertical groove opening out into the outside face of the upstream tab at the lip of the upstream annular flange, while the vertical groove present in the downstream tab of each ring sector extends in a direction that is oblique relative to the axis of the downstream tab, said vertical groove opening out into the outside face of the downstream tab at the lip of the downstream annular flange.

With upstream and downstream vertical grooves extending obliquely in the tabs of each ring sector so as to open out at the bearing portions with the annular flanges of the ring support structure, inter-sector leaks via these bearing portions are reduced.

According to a particular characteristic of the turbine ring of the invention, the two annular flanges of the ring support structure exert stress on the tabs of the ring sectors, and in that at least one of the flanges of the ring support structure is elastically deformable in the axial direction of the ring.

By means of the presence of at least one elastically deformable flange, contact between the flanges of the turbine ring support structure and the tabs of the ring sectors can be maintained independently of temperature variations.

According to another particular characteristic of the turbine ring assembly of the invention, it further comprises a plurality of pegs engaged both in at least one of the annular flanges of the ring support structure and in the tabs of the ring sectors facing said at least one annular flange. The pegs serve both to prevent any potential turning of the ring sectors in the ring support structure and also to hold them radially in said structure.

BRIEF DESCRIPTION OF THE DRAWINGS

The invention can be better understood on reading the following description given by way of non-limiting indication and with reference to the accompanying drawings, in which.

DETAILED DESCRIPTION OF EMBODIMENTS

Figure 1:
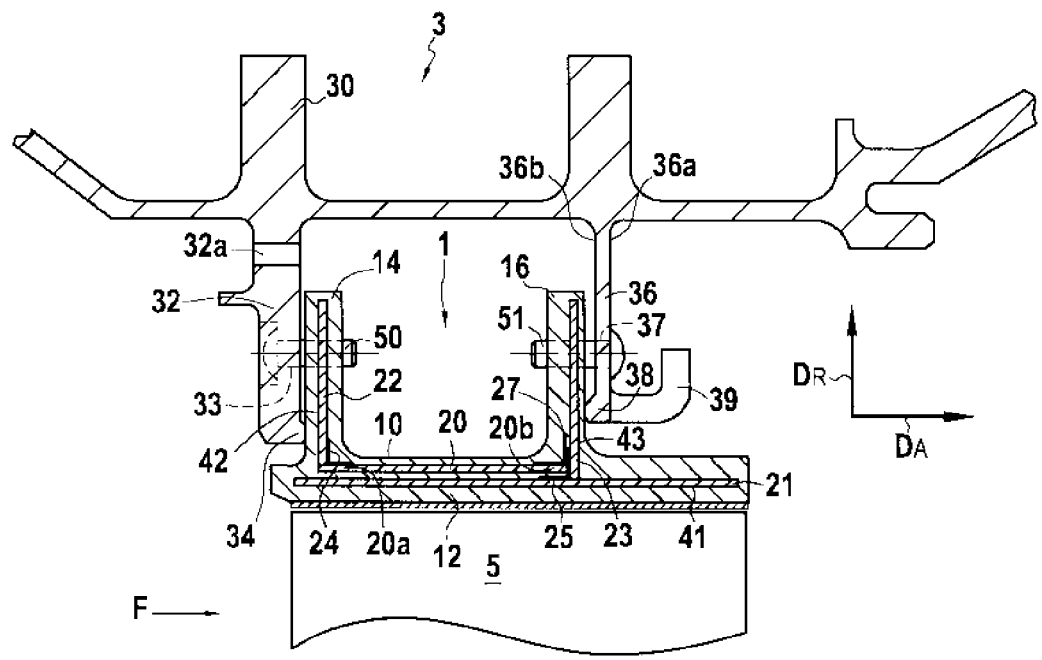
FIG. 1 is a radial half-section view showing an embodiment of a turbine ring assembly of the invention.

FIG. 1 shows a high-pressure turbine ring assembly comprising a turbine ring 1, in this example made of ceramic matrix composite (CMC) material, and a metal ring support structure 3. The turbine ring 1 surrounds a set of rotary blades 5. The turbine ring 1 is made up of a plurality of ring sectors 10, with FIG. 1 being a radial section view on a plane passing between two contiguous ring sectors. Arrow $D_A$ shows the axial direction relative to the turbine ring 1, while arrow $D_R$ shows the radial direction relative to the turbine ring 1.

Each ring sector 10 presents a section that is substantially in the shape of an upside-down letter Pi ($\pi$), with an annular base 12 having an inner face coated in a layer 13 of abradable material and/or a thermal barrier that defines the flow path for the gas stream through the turbine. Upstream and downstream tabs 14 and 16 project from the outer face of the annular base 12 in the radial direction $D_R$. The terms "upstream" and "downstream" are used herein relative to the flow direction of the gas stream through the turbine (arrow F).

The ring support structure 3, which is secured to a turbine casing 30, comprises an annular upstream radial flange 32 having a lip 34 on its face facing the upstream tabs 14 of the ring sectors 10, the lip 34 bearing against the outer faces 14a of the upstream tabs 14. On the downstream side, the ring support structure has an annular downstream radial flange 36 with a lip 38 on its face facing the downstream tabs 16 of the ring sectors 10, the lip 38 bearing against the outer faces 16a of the downstream tabs 16.

The tabs 14 and 16 of each ring sector 10 are mounted with prestress between the annular flanges 32 and 36 so that these flanges, at least when "cold", i.e. at an ambient temperature of about 20° C., and also at all operating temperatures of the turbine, exert stress on the tabs 14 and 16, thereby clamping the sectors between the flanges. This stress is maintained at all temperatures to which the ring assembly may be subjected while the turbine is in operation, and it is controlled, i.e. there is no excess stress on the ring sectors, because of the presence of at least one flange that is elastically deformable, as explained below. Furthermore, in conventional manner, ventilation orifices 32a that are formed in the flange 32 enable cooling air to be brought to the outside of the turbine ring 10. The ring sectors 10 are mounted one after another by spacing apart the annular downstream radial flange 36 away by pulling on it in the axial direction $D_A$ using a hook 39 in order to increase the spacing between the flanges 32 and 36 so as to enable the tabs 14 and 16 to be inserted between the flanges 32 and 36 without risk of damage.

Furthermore, in the presently-described example, the ring sectors 10 are also held by blocking pegs. More precisely, and as shown in FIG. 1, pegs 50 are engaged both in the annular upstream radial flange 32 of the ring support structure 3 and also in the upstream tabs 14 of the ring sectors 10. For this purpose, each peg 50 passes through both an orifice 33 formed in the annular upstream radial flange 32 and also an orifice 15 arranged in each upstream tab 14, the orifices 33 and 15 being in alignment while assembling the ring sectors 10 to the ring support structure 3. Likewise, the pegs 51 are engaged both in the annular downstream radial flange 36 of the ring support structure 3 and also in the downstream tabs 16 of the ring sectors 10. For this purpose, each peg 51 passes through both an orifice 37 formed in the annular downstream radial flange 36 and also an orifice 17 formed in each downstream tab 16, the orifices 37 and 17 being in alignment while assembling the ring sectors 10 to the ring support structure 3.

In accordance with the invention, the ring is sealed by sealing tongues and by angle gaskets. More precisely, and as shown in FIGS. 1, 2A, and 2B, each ring sector 10 has a first horizontal sealing tongue 21 that extends over almost the entire length of the annular base 12 between the upstream and downstream tabs 14 and 16, a second horizontal sealing tongue 20 arranged over the first horizontal tongue and extending over a portion of the length of the annular base 12, an upstream vertical sealing tongue 22 that extends along the upstream tab 14, and a downstream vertical sealing tongue 23 that extends along the downstream tab 16.

Each sealing tongue is housed in facing grooves in the facing edges of two adjacent ring sectors. For this purpose, each ring sector 10 has a first horizontal groove 41 formed in the annular base 12 and in which the first horizontal sealing tongue 21 is received, a second horizontal groove 40 formed in the annular base 12 above the groove 41 and in which the second horizontal sealing tongue 20 is received, an upstream vertical groove 42 formed in the upstream tab 14 and in which the upstream vertical sealing tongue 22 is received, and a downstream vertical groove 43 formed in the downstream tab 16 and in which the downstream vertical sealing tongue 23 is housed. The second horizontal groove 40 opens out at one end into the bottom portion of the upstream vertical groove 42 and at the other end into the bottom portion of the downstream vertical groove 43. Thus, the second horizontal sealing tongue 20 is in contact at one end 20a with the upstream vertical sealing tongue 22 and is contact at the other end 20b with the downstream vertical tongue 23. In addition, the downstream vertical groove 43 opens out into the first horizontal groove 41 so that the bottom end 23b of the downstream vertical sealing tongue 23 is in contact with the first horizontal sealing tongue 21. Concerning the first horizontal groove 41, this is preferably formed as close as possible to the inner face of the ring sector so that the first sealing tongue 21 is as close as possible to the flow passage. This reduces inter-sector clearance and the impact thereof on the tips of the blades.

Figure 2A:
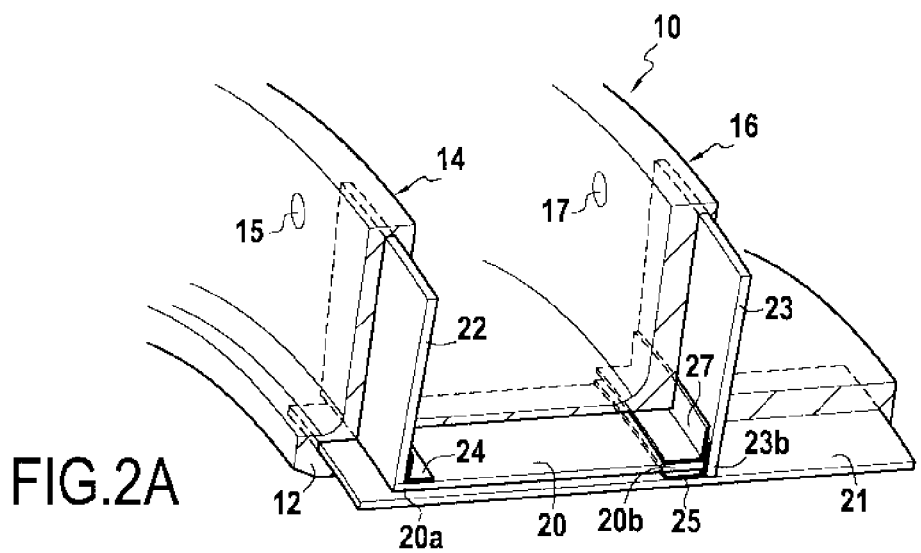
FIGS. 2A and 2B are fragmentary diagrammatic views in perspective showing the positioning of sealing tongues in a ring sector of the FIG. 1 turbine ring assembly.
Figure 2B:
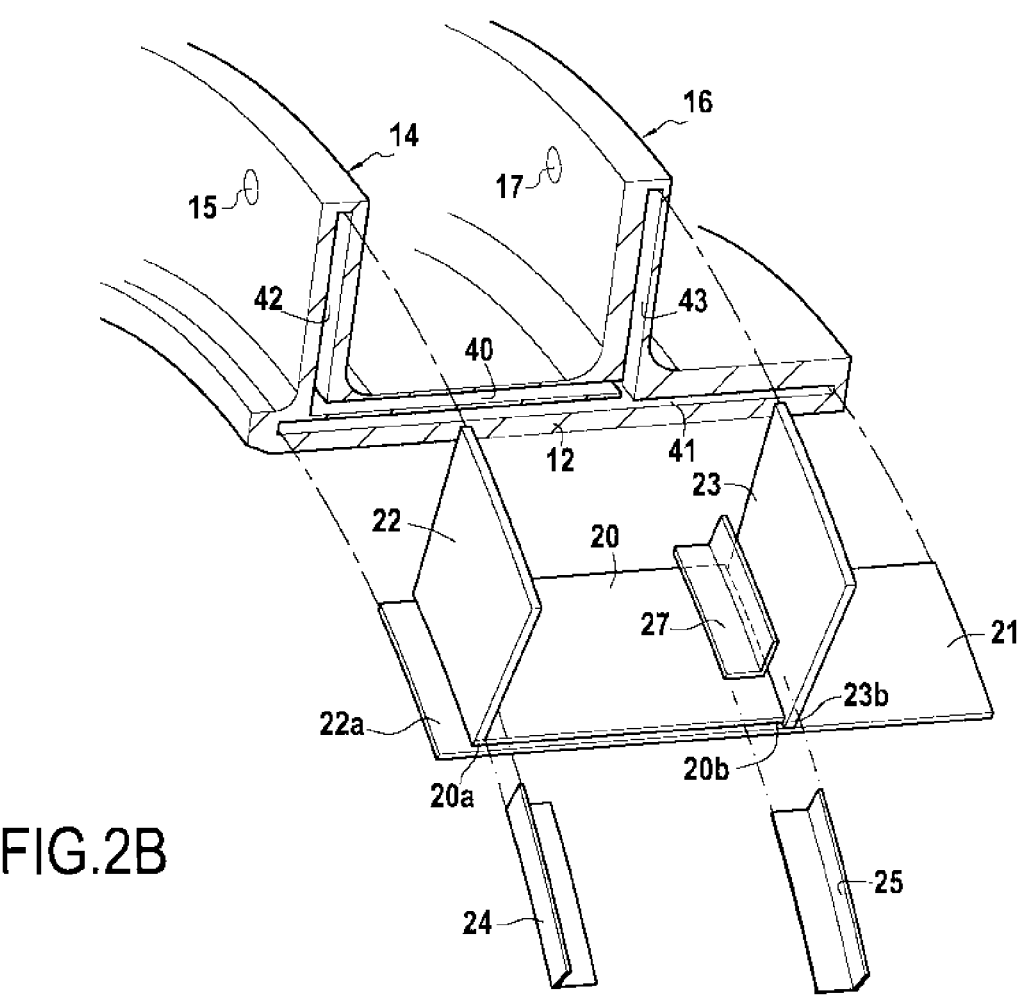

FIGS. 1, 2A, and 2B show a single ring sector 10 in which the tongues 20, 21, 22, and 23 are partially inserted in the grooves 40, 41, 42, and 43, respectively. The portions of the tongues 20, 21, 22, and 23 that project from the ring sector 10 (FIG. 2B) are inserted into corresponding grooves formed in the neighboring ring sector (not shown in FIGS. 1, 2A, and 2B).

By way of example, the tongues 20, 21, 22, and 23 are made of metal and they are preferably mounted to have clearance when cold in the grooves 40, 41, 42, and 43 so as to provide the sealing function at the temperatures that are encountered in operation. As non-limiting examples, the sealing tongues may be made of cobalt-based alloy such as the alloys HA 188 or HS 25, out of high performance (high melting point) metal material, out of molybdenum, out of tungsten, or indeed out of CMC composite material.

In addition, a first sealing element or angle gasket 24 is received both in the upstream vertical groove 42 and in the second horizontal groove 40, and a second sealing element or angle gasket 25 is received both in the first horizontal groove 41 and in the downstream vertical groove 43. The angle gaskets 24 and 25 may be made of folded metal sheets. As non-limiting examples, the angle gaskets may be made of a cobalt-based alloy such as the alloys HA 188 or HA 25, out of high performance (high melting point) metal material, out of molybdenum, out of tungsten, or indeed out of CMC composite material. Optionally, a third sealing element or angle gasket may be used, in this example the sealing element or angle gasket 27 that is received both in the second horizontal groove 40 and in the first vertical groove 43 against the second angle gasket 25.

In the same manner as for the sealing tongues 20, 21, 22, and 23, angle gaskets 24, 25, and 27 are inserted in part in the grooves 42 & 40, in the grooves 41 & 43, and in the grooves 40 & 43, respectively. The portions of the angle gaskets 24 and 25 that project from the ring sector 10 (FIG. 2B) are inserted into corresponding grooves formed in the neighboring ring sector (not shown in FIGS. 1, 2A, and 2B).

With two horizontal sealing tongues being superposed in the radial direction $D_R$, two levels of sealing are formed in the base of the ring, thereby reinforcing inter-sector sealing in the ring while redirecting the air that flows on the outer side of the ring in an upstream direction, i.e. into the rotor wheel formed by the rotary blades inside the ring. Furthermore, the use of angle gaskets 24 and 25 serves to plug leaks that might arise through the contacting portions between the sealing tongues, i.e. at the orthogonal junctions of the grooves. In the presently-described example, the angle gasket 24 prevents leaks through the contacting portions between the second horizontal tongue 20 and the upstream vertical tongue 22, while the angle gasket 25 prevents leaks through the contacting portions between the first horizontal tongue 21 and the downstream vertical tongue 23.

Figure 3:
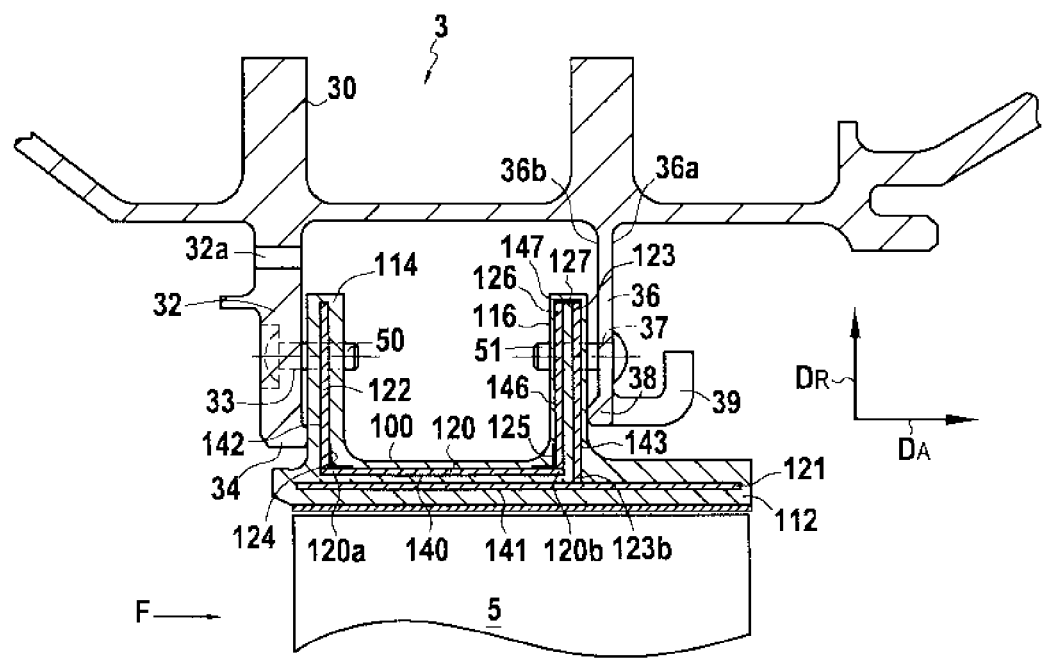
FIGS. 3 to 6 are radial half-section views, each showing another embodiment of a turbine ring assembly of the invention.

FIG. 3 shows a high-pressure turbine ring assembly in another embodiment of the invention. In the FIG. 3 ring assembly, the metal ring support structure is identical to the metal ring support structure 3 described above with reference to FIGS. 1, 2A, and 2B, and it is not described again for reasons of simplification. The FIG. 3 ring assembly differs from that described above with reference to FIGS. 1, 2A, and 2B in that a second downstream vertical sealing tongue is present in the downstream tab of each ring sector.

More precisely, and as shown in FIG. 3, each ring sector 100 is provided with a first horizontal sealing tongue 121 that extends over nearly the entire length of the annular base 112 between the upstream and downstream tabs 114 and 116, a second horizontal sealing tongue 120 arranged over the first horizontal tongue and extending over a portion of the length of the horizontal base 112, an upstream vertical sealing tongue 122 that extends along the upstream tab 114, a first downstream vertical sealing tongue 123 that extends along the downstream tab 116, and a second downstream vertical sealing tongue 126 that extends along the downstream tab 116 upstream from the first tongue 123.

Each sealing tongue is received in facing grooves in the facing edges of two neighboring ring sectors. For this purpose, each ring sector 100 has a first horizontal groove 141 arranged in the annular base 112 and receiving the first horizontal sealing tongue 121, a second horizontal groove 140 formed in the annular base 112 over the groove 141 and receiving the second horizontal sealing tongue 120, an upstream vertical groove 142 arranged in the upstream tab 114 and receiving the upstream vertical sealing tongue 122, a first downstream vertical groove 143 arranged in the downstream tab 116 and receiving the first downstream vertical sealing tongue 123, and a second downstream vertical groove 146 arranged in the downstream tab 116 and receiving the second downstream vertical sealing tongue 126. The second horizontal groove 140 opens out at one end in the bottom portion of the upstream vertical groove 142 and at the other end in the bottom portion of the second downstream vertical groove 146. Thus, the second horizontal sealing tongue 120 is in contact at one end 120a with the upstream vertical sealing tongue 122 and is in contact at the other end 120b with the second downstream vertical tongue 126. In addition, the first downstream vertical groove 143 opens out into the first horizontal groove 141 such that the bottom end 123b of the downstream vertical sealing tongue 123 is in contact with the first horizontal sealing tongue 121.

A tongue 127 is also added between the top ends of the vertical tongues 123 and 126 in order to provide continuity in the sealing formed by the two vertical tongues. The tongue 127 is received in a horizontal groove 147 opening out into the top portion of the vertical grooves 143 and 146.

In addition, a first angle gasket 124 is received both in the upstream vertical groove 142 and in the second horizontal groove 140, while a second angle gasket 125 is received both in the second horizontal groove 140 and in the second downstream vertical groove 146. The angle gaskets 124 and 125 may be made from folded metal sheets. Materials other than those mentioned above may also be envisaged. Optionally, a third sealing example or angle gasket (not shown in FIG. 3) may be received both in the first horizontal groove 141 and in the first vertical groove 143.

With two horizontal sealing tongues superposed in the radial direction $D_R$, two levels of sealing are provided at the base of the ring, thereby reinforcing inter-sector sealing in the ring while redirecting the air flowing on the outside of the ring upstream, i.e. into the rotor wheel formed by the rotary blades inside the ring. Furthermore, using angle gaskets 124 and 125 serves to plug leaks that might occur through contacting portions between the sealing tongues, thereby putting downstream leak sections in series. In the presently-described example, the angle gasket 124 prevents leaks via the contacting portions between the second horizontal tongue 120 and the upstream vertical tongue 122, while the angle gasket 125 prevents leaks via the contacting portions between the second horizontal tongue 120 and the downstream vertical tongue 126. Finally, by adding a second downstream vertical sealing tongue, the effectiveness of sealing is further improved, with a first loss of head occurring as a result of the second downstream vertical tongue 126 before the first downstream vertical sealing tongue 123.

Figure 4:
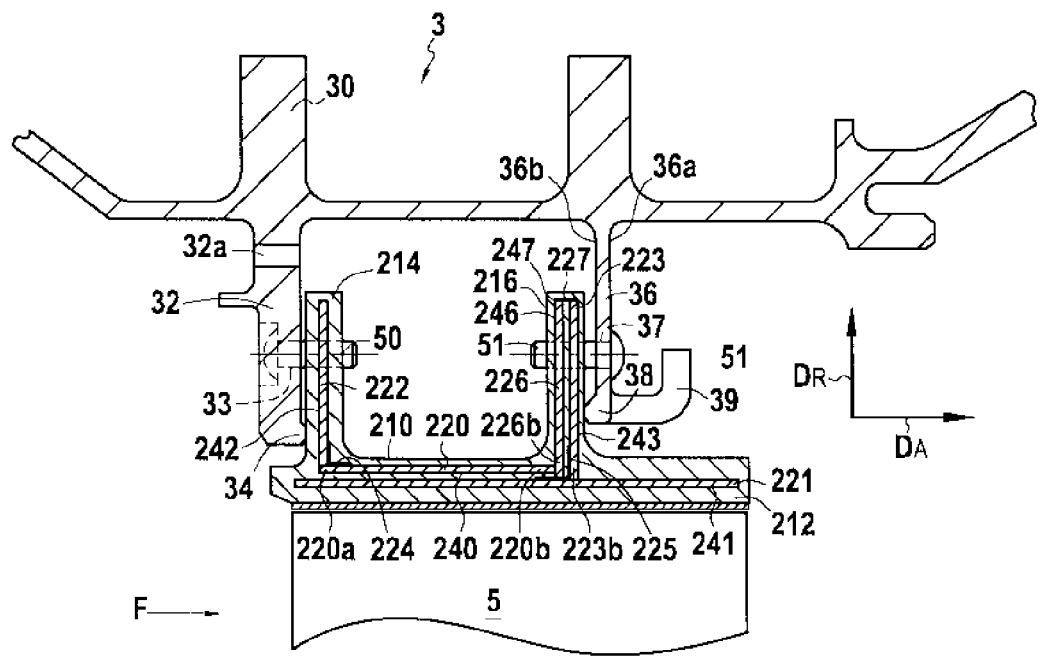

FIG. 4 shows a high-pressure turbine ring assembly in another embodiment of the invention that differs from the embodiment of FIG. 3 in that the second angle gasket is placed in a different position. In the FIG. 4 ring assembly, the ring support metal structure is identical to the ring support metal structure 3 described above with reference to FIGS. 1, 2A, and 2B, and is not described again for reasons of simplification.

More precisely, and as shown in FIG. 4, each ring sector 200 comprises:
a first horizontal sealing tongue 221 received in a first horizontal groove 241 that extends over nearly the entire length of the annular base 212;
a second horizontal sealing tongue 220 received in a second horizontal groove 240 that extends over a portion of the annular base 212;
an upstream vertical sealing tongue 222 received in an upstream vertical groove 242 that extends along the upstream tab 214;
a first downstream vertical sealing tongue 223 received in a first downstream vertical groove 243 that extends along the downstream tab 216; and
a second downstream vertical sealing tongue 226 received in a second downstream vertical groove 246 that extends along the downstream tab 216, upstream from the first tongue 223.

The second horizontal groove 240 opens out at one end into the bottom portion of the upstream vertical groove 242 and at the other end into the bottom portion of the second downstream vertical groove 246. Thus, the second horizontal sealing tongue 220 is in contact at one end 220a with the upstream vertical sealing tongue 222 and is in contact at the other end 220b with the second downstream vertical tongue 226. In addition, the first downstream vertical groove 243 opens out into the first horizontal groove 241 so that the bottom end 223b of the downstream vertical sealing tongue 223 faces the first horizontal sealing tongue 221. Likewise, the second downstream vertical groove 246 opens out into the first horizontal groove 241 so that the bottom end 226b of the downstream vertical sealing tongue 226 faces the first horizontal sealing tongue 221.

A tongue 227 is also added between the top ends of the vertical tongues 223 and 226 in order to provide continuity in the sealing formed by these two vertical tongues. The tongue 227 is received in a horizontal groove 247 that opens out into the top portions of the vertical grooves 243 and 246.

In addition, a first angle gasket 224 is received both in the upstream vertical groove 242 and in the second horizontal groove 240, while a second angle gasket 225 is received both in the first horizontal groove 241 and in the first downstream vertical groove 243. The angle gaskets 224 and 225 may be made from folded metal sheets. Materials other than those mentioned above could also be envisaged. Optionally, a third sealing element or angle gasket (not shown in FIG. 4) may be received both in the second horizontal groove 240 and in the second vertical groove 246.

With two horizontal sealing tongues superposed in the radial direction $D_R$, two levels of sealing are provided at the base of the ring, thereby reinforcing inter-sector sealing in the ring while redirecting the air flowing on the outside of the ring upstream, i.e. into the rotor wheel formed by the rotary blades inside the ring. Furthermore, using angle gaskets 224 and 225 serves to plug leaks that might occur via the contacting portions between the sealing tongues, thereby putting the downstream leak sections into series. In the presently-described example, the angle gasket 224 prevents leaks via the contacting portions between the second horizontal tongue 220 and the upstream vertical tongue 222, while the angle gasket 225 prevents leaks via the contacting portions between the first horizontal tongue 221 and the first downstream vertical tongue 243. Finally, by adding a second vertical sealing tongue downstream, the effectiveness of the sealing is further improved.

Figure 5:
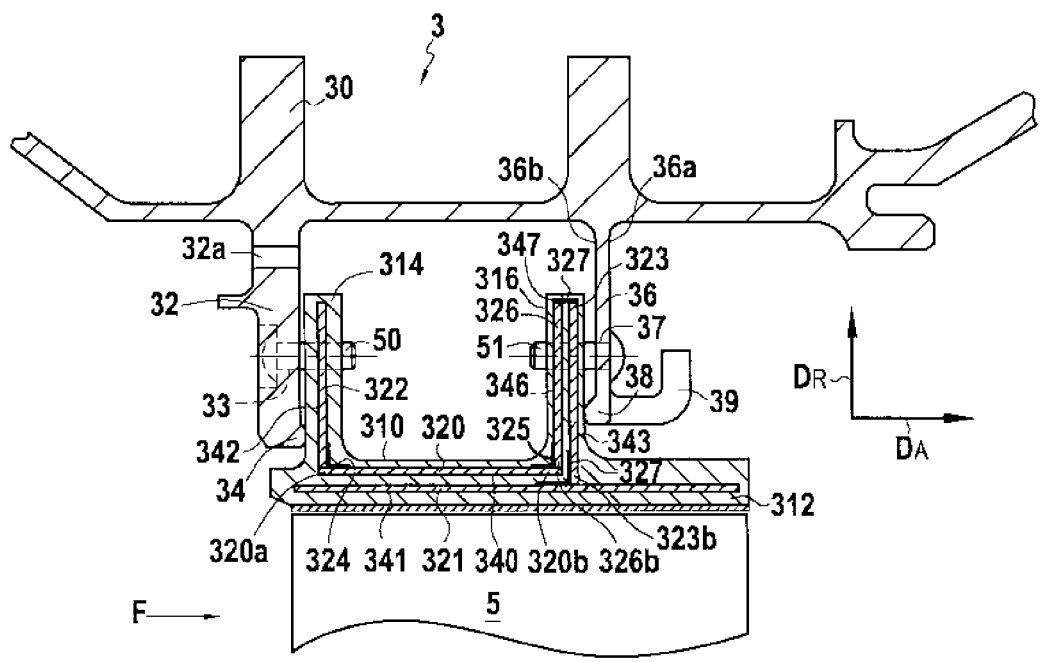

FIG. 5 shows a high-pressure turbine ring assembly in another embodiment of the invention, that differs from the embodiment of FIGS. 3 and 4 in that a third angle gasket is also placed downstream in the ring sectors. In the FIG. 5 ring assembly, the metal ring support structure is identical to the metal ring support structure 3 described above with reference to FIGS. 1, 2A, and 2B, and is not described again for reasons of simplification.

More precisely, and as shown in FIG. 5, each ring sector 300 comprises:
a first horizontal sealing tongue 321 received in a first horizontal groove 341 that extends over nearly the entire length of the annular base 312;

a second horizontal sealing tongue 320 received in a second horizontal groove 340 that extends over a portion of the length of the annular base 312;

an upstream vertical sealing tongue 322 received in an upstream vertical groove 342 that extends along the upstream tab 314;

a first downstream vertical sealing tongue 323 received in a first downstream vertical groove 343 that extends along the downstream tab 316; and a second downstream vertical sealing tongue 326 received in a second downstream vertical groove 346 that extends along the downstream tab 316 upstream from the first tongue 323.

The second horizontal groove 340 opens out at one end into the bottom portion of the upstream vertical groove 342 and at the other end into the bottom portion of the second downstream vertical groove 346. Thus, the second horizontal sealing tongue 320 is in contact at one end 320a with the upstream vertical sealing tongue 322 and is in contact at the other end 320b with the second downstream vertical tongue 326. In addition, the first downstream vertical groove 343 opens out into the first horizontal groove 341 in such a manner that the bottom end 323b of the downstream vertical sealing tongue 323 faces the first horizontal sealing tongue 321.

A tongue 327 is also added between the top ends of the vertical tongues 323 and 326 in order to provide continuity in the sealing formed by these two vertical tongues. The tongue 327 is received in a horizontal groove 347 opening out into the top portions of the vertical grooves 343 and 346.

A first angle gasket 324 is received both in the upstream vertical groove 342 and in the second horizontal groove 340. A second angle gasket 325 is received both in the first horizontal groove 240 and in the second downstream vertical groove 346. A third angle gasket 327 is received both in the first horizontal groove 341 and in the first downstream vertical groove 343. The angle gaskets 324, 325, and 327 may be made from folded metal sheets. Materials other than those mentioned above may also be envisaged.

With two horizontal sealing tongues superposed in the radial direction $D_R$, two levels of sealing are provided at the base of the ring, thereby reinforcing inter-sector sealing in the ring while redirecting the air flowing on the outside of the ring upstream, i.e. into the rotor wheel formed by the rotary blades inside the ring. Furthermore, using angle gaskets 324, 325, and 327 makes it possible to plug leaks that might occur via the contacting portions between the sealing tongues, thereby putting the downstream leak sections into series. In the presently-described example, the angle gasket 324 prevents leaks via the contacting portions between the first horizontal tongue 320 and the upstream vertical tongue 322. The angle gasket 325 prevents leaks via the contacting portions between the second horizontal tongue 320 and the second downstream vertical tongue 346. Finally, the angle gasket 327 prevents leaks via the contacting portions between the first horizontal tongue 321 and the first downstream vertical tongue 343. Finally, adding a second vertical sealing tongue downstream, serves to further improve the effectiveness of the sealing.

Figure 6:
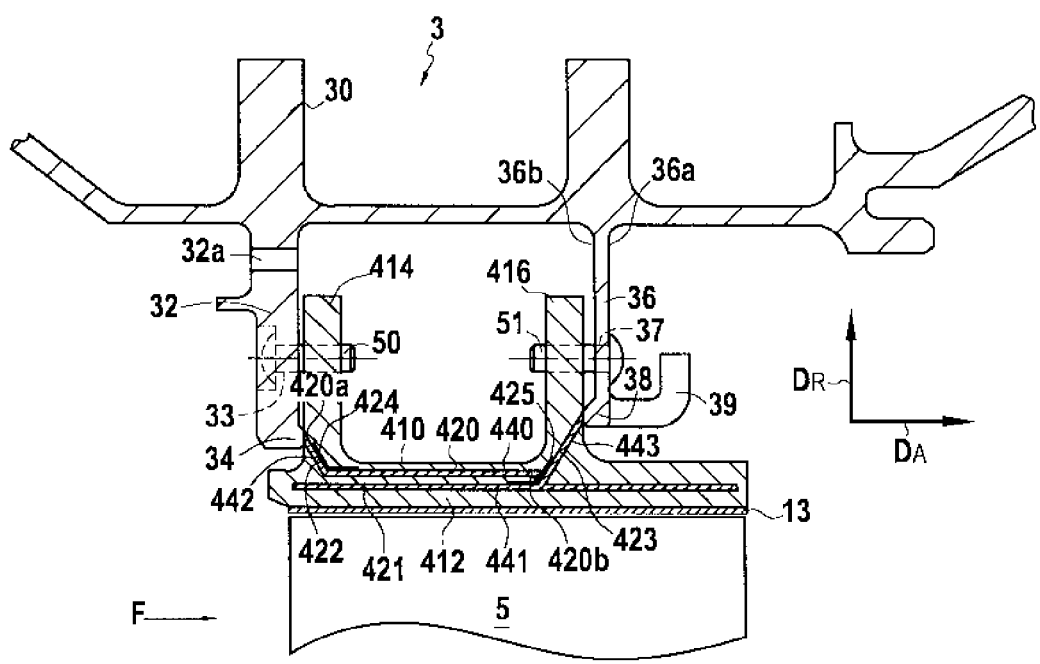

FIG. 6 shows a high-pressure turbine ring assembly in another embodiment of the invention that differs from the embodiment of FIGS. 1, 2A, and 2B in that the upstream and downstream vertical tongues extend in an oblique direction in the upstream and downstream tabs of each ring sector. In the ring assembly of FIG. 6, the metal ring support structure is identical to the metal ring support structure 3 described above with reference to FIGS. 1, 2A, and 2B and is not described again for reasons of simplification.

More precisely, as shown in FIG. 6, each ring sector 400 comprises:

a first horizontal sealing tongue 421 received in a first horizontal groove 441 that extends over nearly the entire length of the annular base 412;

a second horizontal sealing tongue 420 received in a second horizontal groove 440 that extends likewise over a portion of the length of the annular base 412;

an upstream vertical sealing tongue 422 received in an upstream vertical groove 442 that extends along the upstream tab 414; and a second downstream vertical sealing tongue 423 received in a downstream vertical groove 443 that extends along the downstream tab 416.

The second horizontal groove 440 opens out at one end into the bottom portion of the upstream vertical groove 442 and at the other end into the bottom portion of the downstream vertical groove 443. Thus, the second horizontal sealing tongue 420 is in contact at one end 420a with the upstream vertical sealing tongue 422 and is in contact at the other end 420b with the downstream vertical tongue 423. In addition, the downstream vertical groove 443 opens out into the first horizontal groove 441 so that the bottom end 423b of the downstream vertical sealing tongue 423 is in contact with the first horizontal sealing tongue 421.

A first sealing element of angle gasket 424 is received both in the upstream vertical groove 442 and in the second horizontal groove 440. A second sealing element of angle gasket 425 is received both in the first horizontal groove 441 and in the downstream vertical groove 443. The angle gaskets 424 and 425 may be made from folded metal sheets. Materials other than those mentioned above may also be envisaged. Optionally, a third sealing element or angle gasket (not shown in FIG. 6) may be received both in the second horizontal groove 440 and in the downstream vertical groove 443.

The upstream vertical groove 424 present in the upstream tab 414 of each ring sector 400 extends in a direction that is oblique relative to the axis of the upstream tab 414. The upstream vertical groove opens out to the outside face 414a of the upstream tab 414 at the lip 34 of the upstream annular flange 32 of the metal ring support structure 3. The downstream vertical groove 443 present in the downstream tab 414 of each ring sector 400 extends in a direction that is oblique relative to the axis of the downstream tab 416. The downstream vertical groove 443 opens out to the outside face 416a of the downstream tab 416 at the lip 38 of the downstream annular flange 36 of the metal ring support structure 3. In this configuration, the upstream and downstream vertical grooves open out where the upstream and downstream annular flanges of the metal ring support structure apply pressure. This serves to reduce the distance between the top ends of the upstream and downstream vertical tongues and the bearing portions of the upstream and downstream annular flanges of the metal ring support structure.

With two horizontal sealing tongues superposed in the radial direction $D_R$, two levels of sealing are provided at the base of the ring, thereby reinforcing inter-sector sealing in the ring while redirecting the air flowing on the outside of the ring upstream, i.e. into the rotor wheel formed by the rotary blades inside the ring. Furthermore, using angle gaskets 424 and 425 makes it possible to plug leaks that might occur via the contacting portions between the sealing tongues, and thereby put the downstream leak sections into series. In the presently-described example, the angle gasket 424 prevents leaks via the contacting portions between the second horizontal tongue 420 and the upstream vertical tongue 422. The angle gasket 425 prevents leaks via the contacting portions between the first horizontal tongue 421 and the downstream vertical tongue 443. Finally, with upstream and downstream vertical grooves extending obliquely in the tabs of each ring sector so as to open out at the bearing portions of the annular flanges of the ring support structure, inter-sector leaks are reduced via these bearing portions.

The above-described ring sectors are made of ceramic matrix composite material. Nevertheless, the present invention applies equally well to a turbine ring assembly having a plurality of ring sectors made of metal material, the ring sectors being of shapes similar to those described above.

The invention claimed is:

1. A turbine ring assembly comprising:
   a plurality of ring sectors together forming a turbine ring; and
   a ring support structure comprising an upstream annular flange and a downstream annular flange, each ring sector having a first portion forming an annular base with an inner face defining an inside face of the turbine ring and an outer face from which an upstream tab and a downstream tab radially extend, the upstream and downstream tabs of each ring sector being held between the upstream and downstream annular flanges of the ring support structure, each ring sector having a first horizontal sealing tongue extending along the annular base, the first horizontal sealing tongue being received in a first horizontal groove present in the annular base, an upstream vertical sealing tongue extending along the upstream tab, the upstream vertical sealing tongue being received in a vertical groove present in the upstream tab, and a first downstream vertical sealing tongue extending along the downstream tab, the first downstream vertical sealing tongue being received in a first vertical groove present in the downstream tab,
   wherein each ring sector further comprises a second horizontal sealing tongue extending over a portion of the annular base over the first horizontal sealing tongue in a radial direction of the ring, the second horizontal sealing tongue being received in a second horizontal groove present in the annular base,
   wherein a first angled sealing element is received both in the vertical groove present in the upstream tab and in the second horizontal groove, while a second angled sealing element is received both in the first horizontal groove and in the first vertical groove present in the downstream tab, the first vertical groove opening out into the first horizontal groove, or while a second angled sealing element is received both in the second horizontal groove and in the first vertical groove present in the downstream tab, the first vertical groove opening out into the second horizontal groove, and
   wherein the turbine ring assembly further comprises a plurality of pegs engaged both in at least one of the annular flanges of the ring support structure and in the tabs of the ring sectors facing said at least one annular flange.

2. The turbine ring assembly according to claim 1, wherein each ring sector further comprises a second downstream vertical sealing tongue extending along the downstream tab, the second downstream vertical sealing tongue being received in a second vertical groove present in the downstream tab, one end of the second downstream vertical sealing tongue being in contact with the second horizontal sealing tongue, the second vertical groove present in the downstream tab opening out into the second horizontal groove, the second angled sealing element being received both in the second horizontal groove and in the second vertical groove present in the downstream tab.

3. The turbine ring assembly according to claim 2, wherein a third angled sealing element is received both in the first horizontal groove and in the first vertical groove present in the downstream tab.

4. The turbine ring assembly according to claim 1, wherein each ring sector further comprises a second downstream vertical sealing tongue extending along the downstream tab, the second downstream vertical sealing tongue being received in a second vertical groove present in the downstream tab, the second downstream vertical sealing tongue being in contact with the second horizontal sealing tongue, the second vertical groove present in the downstream tab opening out into the first and second horizontal grooves, the second angled sealing element being received both in the first horizontal groove and in the first vertical groove present in the downstream tab.

5. The turbine ring assembly according to claim 1, wherein the upstream annular flange includes a lip in contact with the upstream tab of each ring sector, while the downstream annular flange includes a lip in contact with the downstream tab of each ring sector, and
   wherein the vertical groove present in the upstream tab of each ring sector extends in a direction that is oblique relative to an axis of the upstream tab, said vertical groove opening out into the outside face of the upstream tab at the lip of the upstream annular flange, while the vertical groove present in the downstream tab of each ring sector extends in a direction that is oblique relative to an axis of the downstream tab, said vertical groove opening out into the outside face of the downstream tab at the lip of the downstream annular flange.

6. The turbine ring assembly according to claim 5, wherein the second angled sealing element is received both in the first horizontal groove and in the first vertical groove present in the downstream tab.

7. The turbine ring assembly according to claim 1, wherein the two annular flanges of the ring support structure exert stress on the upstream and downstream tabs of the ring sectors, and wherein at least one of the flanges of the ring support structure is elastically deformable in an axial direction of the ring.

8. The turbine ring assembly according to claim 1, wherein a radially lower end of the upstream vertical sealing tongue abuts the second horizontal sealing tongue and a radially lower end of the downstream vertical sealing tongue abuts the first horizontal sealing tongue.

* * * * *